United States Patent [19]
Kobayashi

[11] Patent Number: 5,609,310
[45] Date of Patent: Mar. 11, 1997

[54] RECORDING AND/OR REPRODUCING APPARATUS HAVING A TAPE TENSION CONTROL DEVICE

[75] Inventor: Junji Kobayashi, Tokyo, Japan

[73] Assignee: Canon Kabushiki Kaisha, Tokyo, Japan

[21] Appl. No.: 681,609

[22] Filed: Jul. 29, 1996

Related U.S. Application Data

[63] Continuation of Ser. No. 326,695, Oct. 20, 1994, abandoned.

[30] Foreign Application Priority Data

Oct. 29, 1993 [JP] Japan .................................. 5-294690

[51] Int. Cl.$^6$ .......................... B65H 59/38; G11B 15/46; G11B 23/04
[52] U.S. Cl. .................. 242/334.6; 242/336; 242/421.8; 242/422.8; 360/94
[58] Field of Search .................................. 242/334.6, 336, 242/421.8, 421.9, 422.8, 422, 156.2; 360/94

[56] References Cited

U.S. PATENT DOCUMENTS

| 4,984,109 | 1/1991 | Yokoo .................................. 242/336 X |
| 5,305,162 | 4/1994 | Kushiro et al. ........................... 360/85 |

FOREIGN PATENT DOCUMENTS

58-19763  2/1983  Japan ..................................... 242/336

*Primary Examiner*—John Q. Nguyen
*Attorney, Agent, or Firm*—Robin, Blecker, Daley & Driscoll

[57] ABSTRACT

In a tape tension control device having a first base on which there are disposed a reel mount and a brake mechanism arranged to apply a braking force to the reel mount, a second base arranged to support the first base in such a way as to allow the first base to take a plurality of positions, and a tension detecting mechanism which is disposed on the second base and includes a guide member arranged to abut on a tape, the brake mechanism and the tension detecting mechanism are arranged to act in association with each other when the first base takes each of the plurality of positions relative to the second base.

23 Claims, 5 Drawing Sheets

RECORDING AND/OR REPRODUCING APPARATUS HAVING A TAPE TENSION CONTROL DEVICE

This is a continuation application under 37 CFR 1.62 of prior application Ser. No. 08/326,695, filed Oct. 20, 1994, abandoned.

BACKGROUND OF THE INVENTION

1. Field of the Invention

This invention relates to a tape tension control device for a recording and/or reproducing apparatus which can be loaded selectively with a plurality of kinds of tape cassettes having different distances between reels by causing reel mounts to take a plurality of positions correspondingly with the plurality of kinds of tape cassettes.

2. Description of the Related Art

Some of video cassette recorders (hereinafter referred to as VCRs) or the like are arranged to be able to be loaded selectively with a plurality of kinds of tape cassettes having different distances between reels. Generally, in the VCR of such a type, a pair of reel mounts are arranged to be movable to a plurality of positions where the reel mounts can be matched with a pair of reels disposed within a tape cassette selected from among the plurality of kinds of tape cassettes, which are, for example, two kinds, i.e., large and small cassettes.

In electrically controlling the tension of the tape in the VCR of that type, the pair of reel mounts are driven by two respective direct reel motors. The tape tension is controlled by controlling the direct reel motors independently of each other.

The electrical control of the tape tension, however, necessitates use of many electrical component parts. The use of many parts has inevitably caused a cost increase.

For a mechanical control of the tape tension, on the other hand, it has been known to use a tape tension control device wherein a tension pin which detects the tape tension and a brake part which brakes the reel mounts are integrated. In a case where the reel mounts are arranged to be movable to a plurality of positions (two positions for a large cassette and a small cassettes, for example), the position of the brake part of the mechanical tape tension control device must also be arranged to be movable to a plurality of positions correspondingly with the plurality of positions of the reel mounts. Then, since the tension pin and the brake part are integrated with each other, the mechanical tape tension control device cannot be arranged to effectively operate for each of the plurality of positions of the reel mounts.

SUMMARY OF THE INVENTION

This invention is directed to the solution of the problems mentioned in the foregoing. It is, therefore, a general object of this invention to provide a tape tension control device which is capable of adequately controlling the tape tension in a mechanical manner for a recording and/or reproducing apparatus which permits selectively use of tape cassettes of different sizes.

To attain this object, an apparatus arranged as an embodiment of this invention to be capable of selectively using cassettes of different sizes each containing a tape therein includes a first base on which a reel mount and a brake mechanism arranged to apply a braking force to the reel mount are disposed, a second base arranged to support the first base in such a way as to allow the first base to move between a plurality of positions corresponding to the different sizes of the cassettes loadable on the apparatus, a tension detecting mechanism disposed on the second base and arranged to detect the tension of a tape which is pulled out from the loaded cassette to form a predetermined tape path, and control means for associating the brake mechanism and the tension detecting mechanism with each other in such a way that the brake mechanism is operable when the first base takes each of the plurality of positions.

To attain the object from a different viewpoint, an apparatus arranged to be capable of selectively using cassettes of different sizes each containing a tape therein and arranged to record and/or reproduce information on or from the tape through a head includes a first base on which a reel mount is disposed, a second base on which the head is disposed, the second base being arranged to support the first base in such a way as to allow the first base to move between a plurality of positions corresponding to the different sizes of the cassettes loadable on the apparatus, and a tension control mechanism including a brake mechanism disposed on the first base and arranged to apply a braking force to the reel mount, a tension detecting mechanism disposed on the second base and arranged to detect the tension of a tape which is pulled out from the loaded cassette to form a predetermined tape path, and control means for associating the brake mechanism and the tension detecting mechanism with each other in such a way that the brake mechanism is operable when the first base takes each of the plurality of positions.

The above and other objects and features of this invention will become apparent from the following detailed description of a preferred embodiment thereof taken in connection with the accompanying drawings.

DETAILED DESCRIPTION OF THE PREFERRED EMBODIMENT

A tape tension control device arranged according to this invention as an embodiment thereof is described below with reference to FIGS. 1 to 5.

Figure 1:
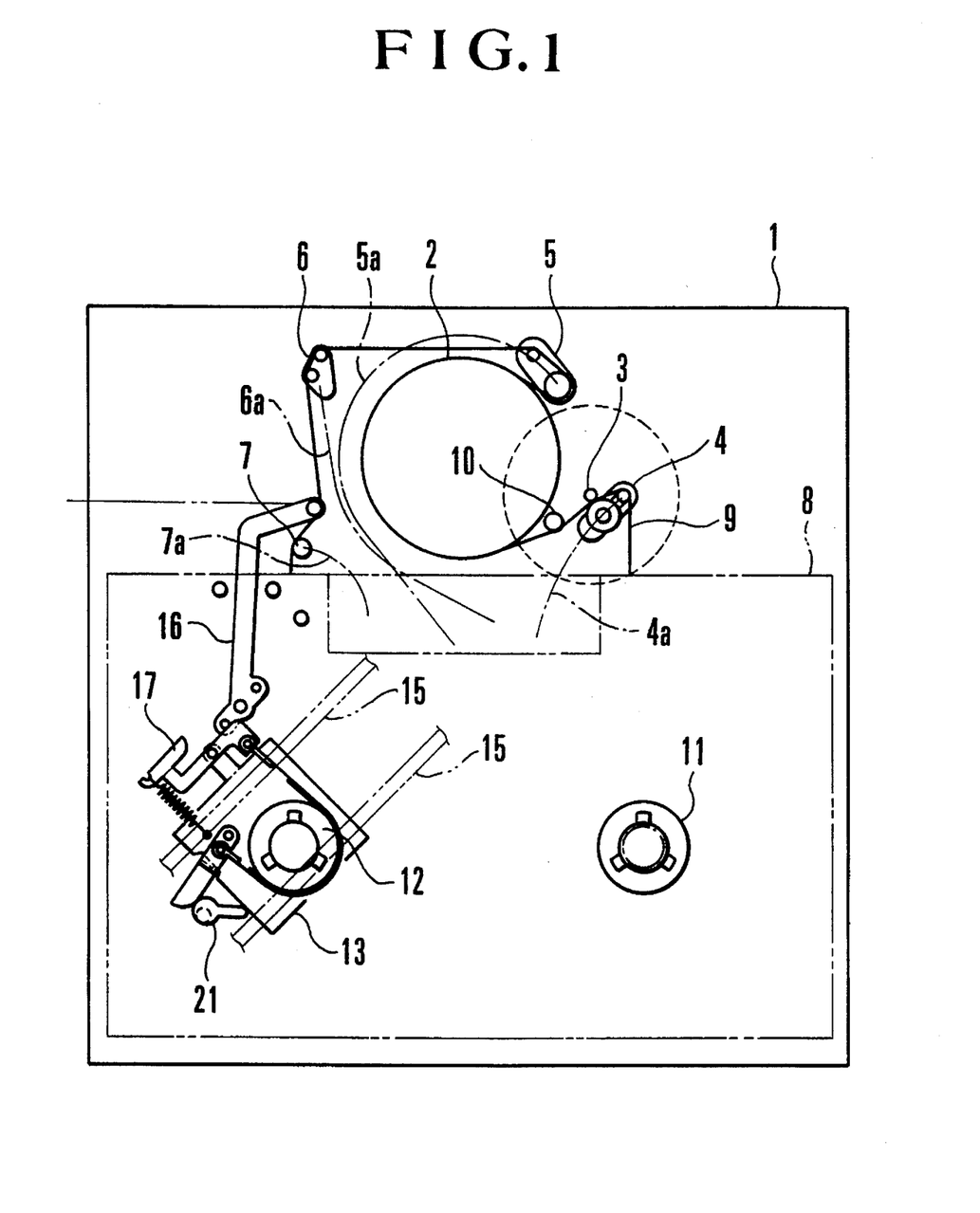
FIG. 1 is a plan view showing in outline a tape tension control device arranged as an embodiment of this invention, the device being shown in a state of permitting use of a large cassette.

FIG. 1 shows in outline the arrangement of a recording and/or reproducing apparatus according to this invention. The illustration includes a chassis 1, a rotary drum 2 which is placed on the chassis 2 and on which a head (not shown) is mounted for recording and/or reproducing information, a capstan 3, a pinch skate 4 on which a pinch roller is mounted, a leading skate 5, a trailing skate 6 and a cassette post 7. The pinch skate 4, the leading skate 5, trailing skate 6 and the cassette post 7 are arranged to pull out a tape 9 from a large cassette 8 loaded on the chassis 1 by moving respectively along moving paths 4a, 5a, 6a and 7a. The pulled-out portion of the tape 9 is wrapped around the rotary drum 2 and a post 10 disposed on an exit side in a manner as shown in FIG. 1.

Figure 2:
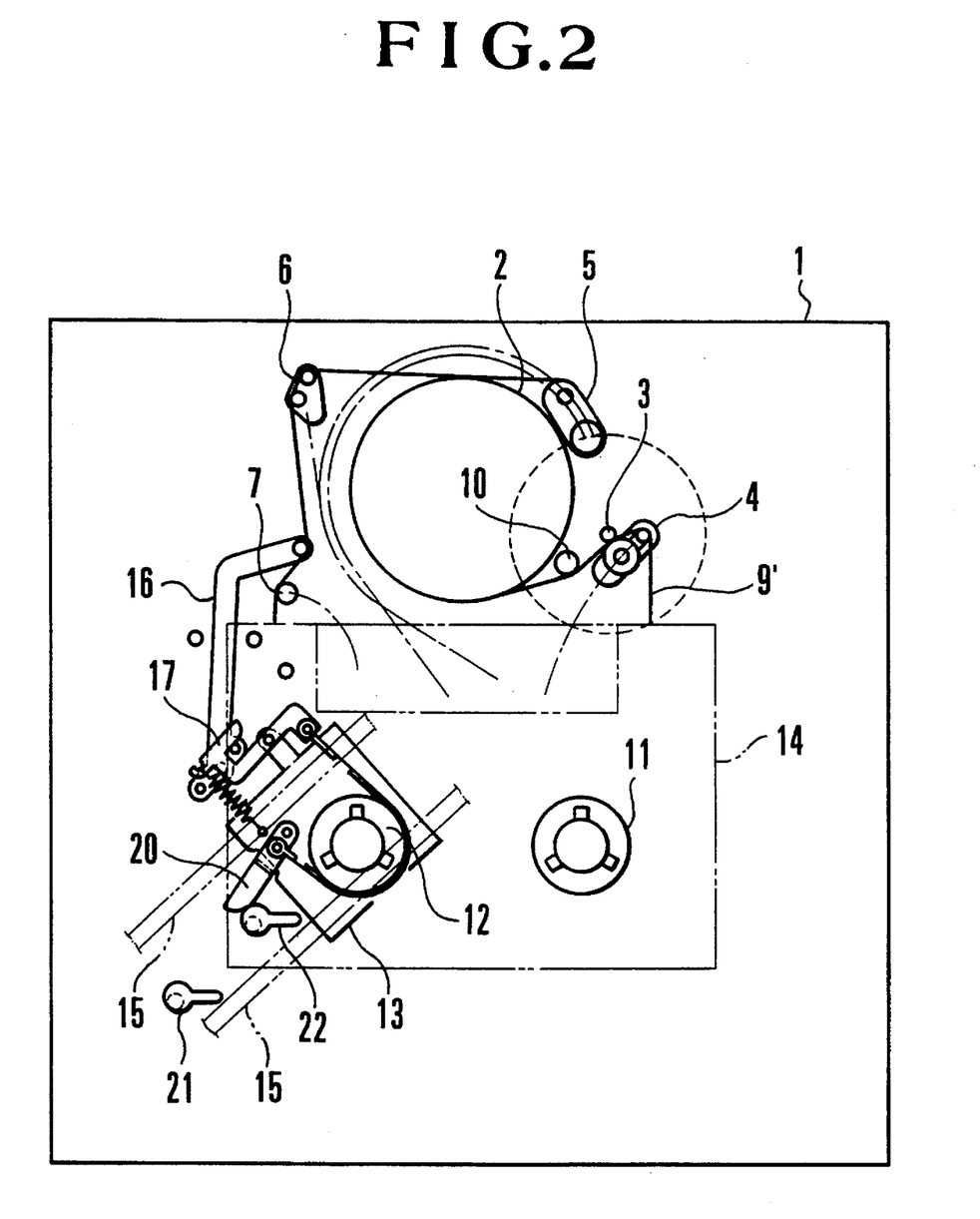
FIG. 2 is a plan view showing in outline the arrangement of the same tape tension control device in a state of permitting use of a small cassette.

A take-up reel mount 11 and a supply reel mount 12 are placed respectively on a take-up reel base (not shown) and a supply reel base 13. The take-up reel base and the supply reel base 13 are arranged to be movable along rails 15 for a small cassette 14 when the small cassette 14 is loaded on the chassis 1, as shown in FIG. 2. The take-up reel base and the supply reel base 13 are thus arranged to be movable between predetermined positions for both the large cassette 8 and the small cassette 14.

Figure 3:
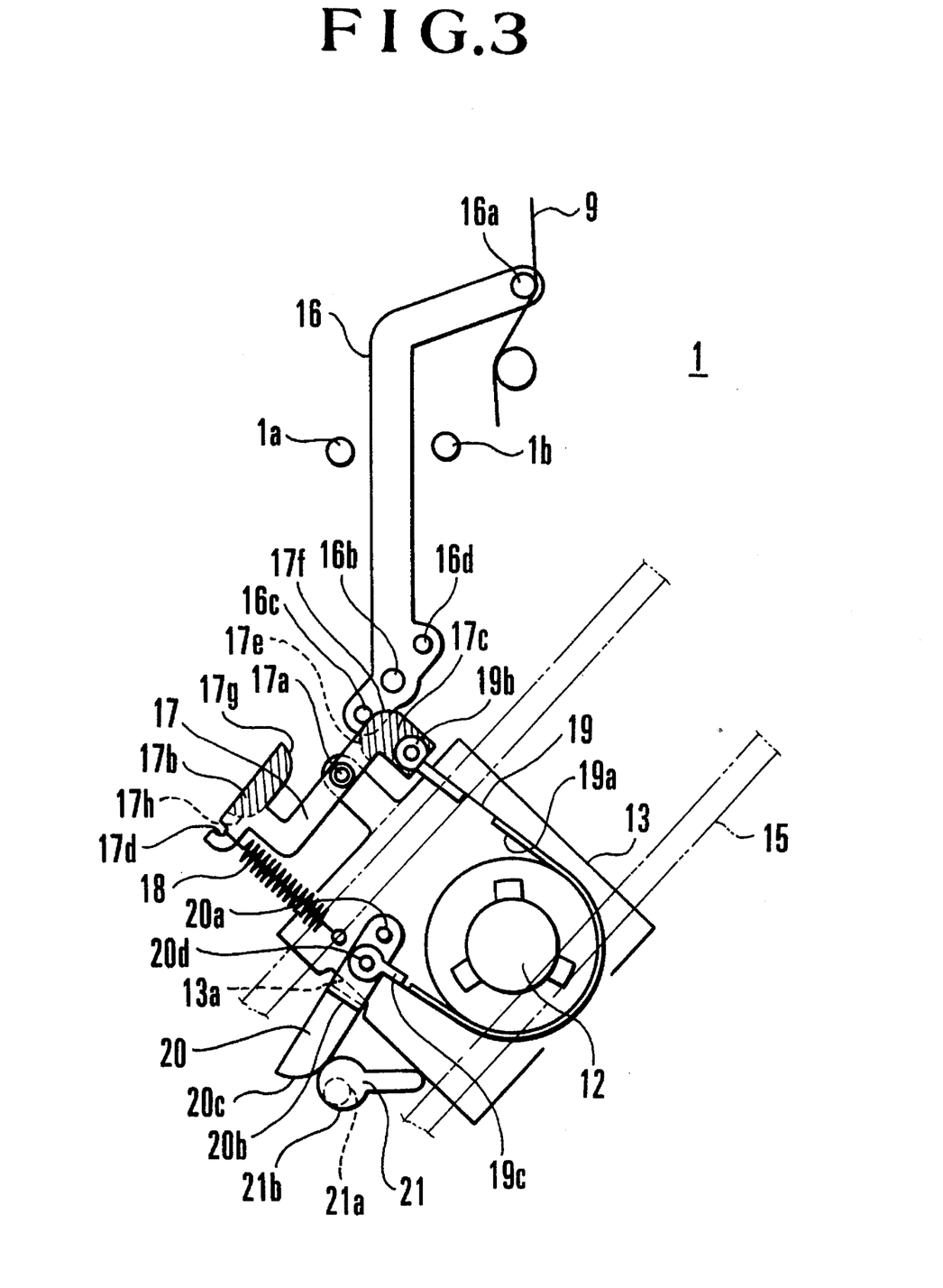
FIG. 3 is a plan view showing the arrangement of essential parts of the same tape tension control device in a state of permitting use of the large cassette.
Figure 4:
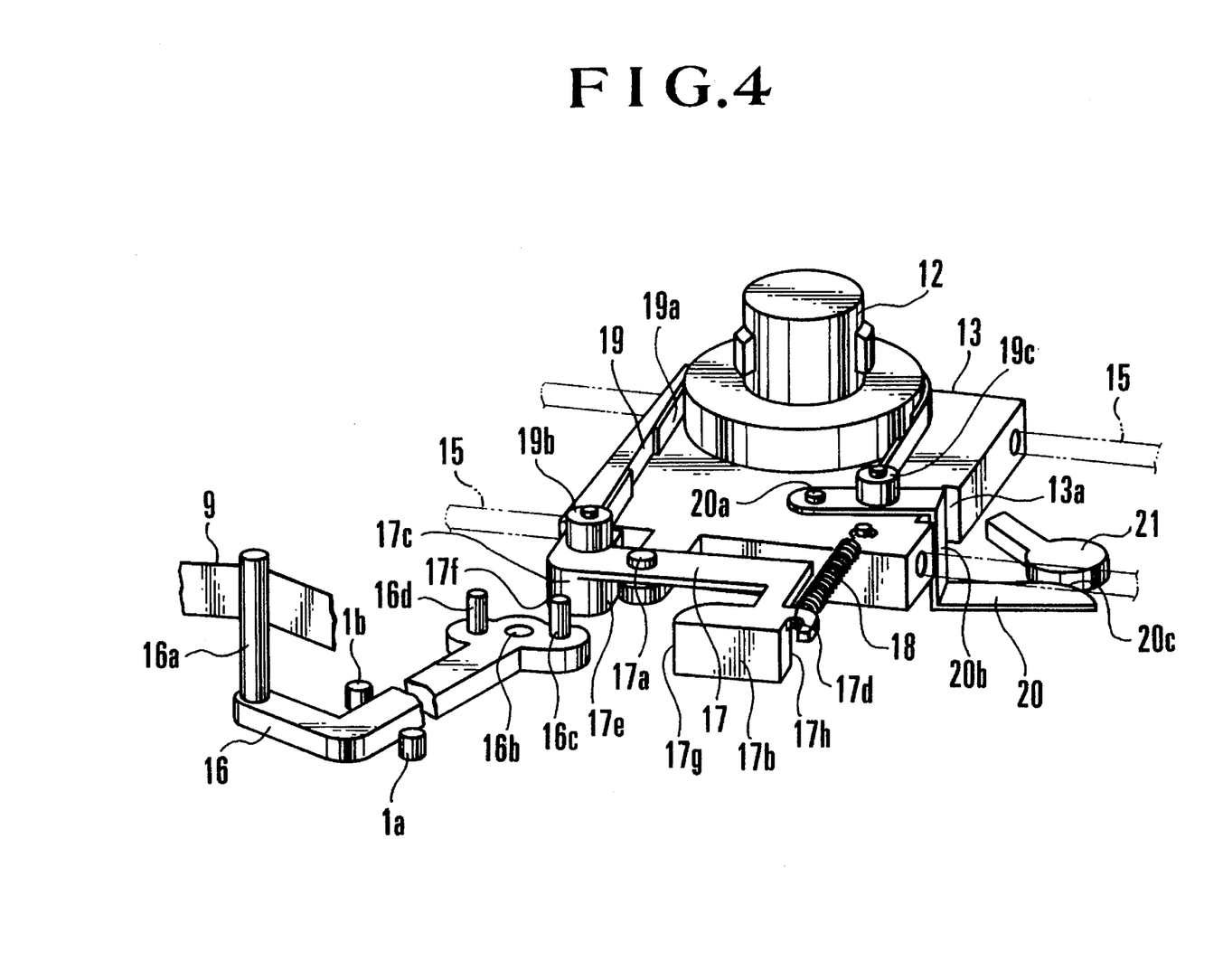
FIG. 4 is an oblique view showing the arrangement of essential parts of the same tape tension control device in a state of permitting use of the large cassette.

FIGS. 3 and 4 show the arrangement of the essential parts of this embodiment in a state obtained for use of the large cassette 8. Referring to FIGS. 3 and 4, a tension arm 16 is disposed on the chassis 1 to be swingable on a shaft 16b and has a pin 16a arranged to be able to abut on the tape 9. The tension arm 16 is arranged to be able to abut on projections 1a and 1b provided on the chassis 1 and to have its position restricted by the projections 1a and 1b.

Pins 16c and 16d are erected on the tension arm 16 to serve as shaft parts respectively for the large cassette 8 and the small cassette 14. A brake arm 17 is arranged to be swingable over the supply reel base 13 through a shaft 17a. The brake arm 17 has its end parts 17b and 17c set at such height positions to be able to come into contact respectively with the large-cassette pin 16c and the small-cassette pin 16d, as shown by hatched parts in FIG. 3. A tension spring 18 is stretched between a hook part 17d of the brake arm 17 and a suitable part of the supply reel base 13. The tension arm 16 is set in such a position not to come into contact with the brake arm 17 and the supply reel base 13.

A tension belt 19 which has elasticity is provided on its inner side with a friction member 19a, which is made of a felt material or the like. One end 19b of the tension belt 19 is rotatably set at the end part 17c of the brake arm 17, while the friction member 19a is set in such a height position that the friction member 19a can abut on the peripheral part of the supply reel mount 12. The other end 19c of the tension belt 19 is rotatably set at a shaft part 20d of a belt stop 20.

The belt stop 20 is swingably set through a shaft 20a on the supply reel base 13. A bent-up part 20b of the belt stop 20 is arranged to be able to abut on a recessed part 13a formed in the supply reel base 13.

An adjustment lever 21 (for the large cassette 8) is rotatable on a shaft 21a over the chassis 1 and is disposed lower than the supply reel base 13. The adjustment lever 21 has a cylindrical part 21b formed on its periphery in such a way as to be able to abut on an end part 20c of the belt stop 20 and to have a minimum radius from the center of the shaft 21a of the adjustment lever 21. The adjustment lever 21 is arranged such that, when the end part 20c of the belt stop 20 abuts on the cylindrical part 21b, no gap is left between the bent-up part 20b of the belt stop 20 and the recessed part 13a of the supply reel base 13.

Another adjustment lever 22 (for the small cassette 14) is also arranged in the same manner as the adjustment lever 21, so as to to act on the belt stop 20 when the supply reel base 13 is in its position set for the small cassette 14, as shown in FIG. 2.

With the embodiment arranged as described above, when the tension arm 16 is abutting on the projection 1a of the chassis 1, the large-cassette pin 16c can come into contact with arc parts 17e and 17f of the brake arm 17, while the small-cassette pin 16d can come into contact with another arc part 17g of the brake arm 17.

When the tension arm 16 is abutting on the other projection 1b instead of the projection 1a of the chassis 1, the large-cassette pin 16c can come into contact with the arc parts 17g and 17h of the brake arm 17, while the small-cassette pin 16d can come into contact with the arc part 17e.

The operation of the tape tension control device which is arranged as described above is as follows.

With the large cassette 8 loaded (see FIGS. 1 and 3), when the tension of the tape 9 increases, a counterclockwise turning force on the tension arm 16 increases. Then, a pressing force by the large-cassette pin 16c against the end part 17c of the brake arm 17 increases. This pressing force increases the clockwise turning force on the brake arm 17 against the elastic force of the tension spring 18. The wrapping force of the tension belt 19 on the peripheral part of the supply reel mount 12 is then lowered, thereby lowering the braking torque applied to the supply reel mount 12. The tension of the tape 9 thus can be lowered.

When the tension of the tape 9 becomes low, on the other hand, the embodiment acts to increase the tension in a manner reverse to the action described above.

Figure 5:
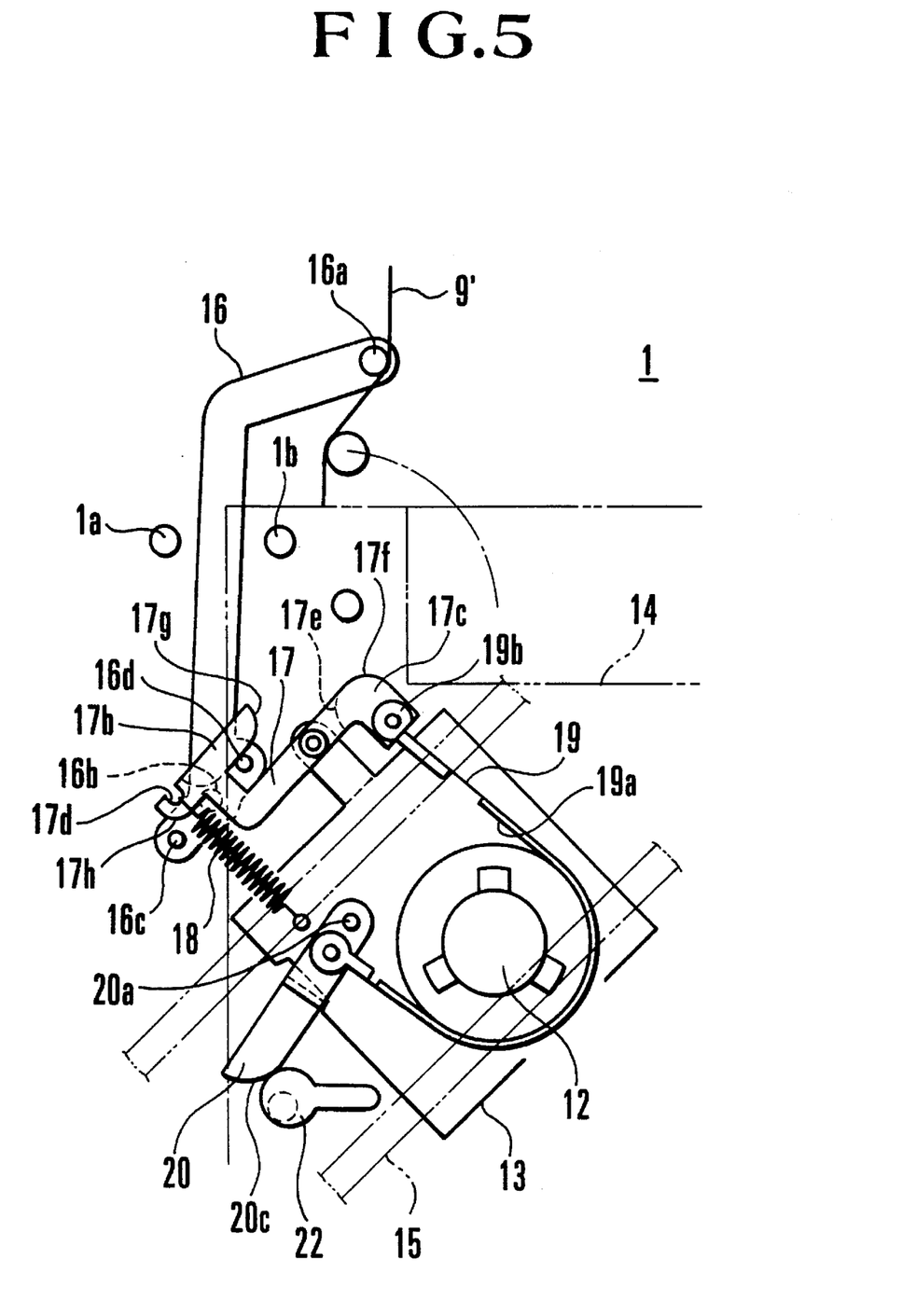
FIG. 5 is a plan view showing the arrangement of essential parts of the same tape tension control device in a state of permitting use of the small cassette.

In a case where the small cassette 14 is loaded as shown in FIG. 5, the embodiment operates as follows:

When the tension of a tape 9' of the small cassette 14 increases, a counterclockwise turning force on the tension arm 16 increases. The pressing force by the small-cassette pin 16d against the end part 17b of the brake arm 17 then increases. Therefore, the clockwise turning force on the brake arm 17 increases against the elastic force of the tension spring 18. As a result, the wrapping force of the tension belt 19 on the peripheral part of the supply reel mount 12 is lowered, thereby lowering the brake torque applied to the supply reel mount 12, so that the tension of the tape 9' can be lowered.

When the tension of the tape 9' becomes low, on the other hand, the embodiment increases the tension by acting reversely to the above-stated action.

The tension of the tape thus can be adequately controlled by the tension control device, particularly by the appositely associated actions of the tension arm 16 and the brake arm 17 when either the large cassette 8 or the small cassette 14 is loaded on the apparatus.

In both cases where the state of the embodiment is to shift from the state of permitting use of the large cassette 8 (FIG. 3) to the state of permitting use of the small cassette 14 (FIG. 5) and vice versa, the shift is carried out before the cassette 8 or 14 and the tape 9 or 9' are loaded.

For example, in shifting from the state of FIG. 3 to the state of FIG. 5, the tension arm 16 is located within a range defined by the projections 1a and 1b. The large-cassette pin 16c of the tension arm 16 moves along the arc part 17g of the brake arm 17, and the small-cassette pin 16d of the tension arm 16 moves along the arc parts 17f and 17g of the brake arm 17, so as to bring about the state of FIG. 5.

In shifting conversely from the state of FIG. 5 to the state of FIG. 3, the small-cassette pin 16d moves along the arc part 17e of the brake arm 17, and the large-cassette pin 16c moves along the arc parts 17h and 17e of the brake arm 17, so as to bring about the state of FIG. 3.

Meanwhile, when the supply reel base 13 moves for loading either the large cassette 8 or the small cassette 14 as mentioned above, the belt stop 20 comes to abut on the adjustment lever 21 or the adjustment lever 22 through an arc part. This arrangement ensures the smooth actions of these two parts.

When the adjustment lever 21 is caused to rotate in the state of FIG. 3, a distance between the center of rotation of the adjustment lever 21 and a point at which the adjustment lever 21 is abutting on the belt stop 20 varies. Therefore, the rotation of the adjustment lever 21 causes the belt stop 20 to swing on the shaft 20a. The swing of the belt stop 20 then causes the end 19c of the tension belt 19 to move. The other end 19b of the tension belt 19, therefore, also moves. The movement of the end 19b causes the brake arm 17 to swing on the shaft 17a. Then, the tape 9 comes to abut on the tension pin 16a of the tension arm 16. The position of the tension pin 16a thus can be changed with the large-cassette pin 16c abutting on the brake arm 17.

When the belt stop 20 is in its position for the small cassette 14, the belt stop 20 abuts on the other adjustment lever 22. In this case, the tape tension can be adjusted to an optimum state also by rotating the adjustment lever 22.

In the conventional mechanical tape tension control device, a tension control mechanism is arranged for each of reel mounts. The tension control mechanism, however, is in a plurality of positional relations to the plurality of positions of the reel mount. Therefore, in a case where one tension adjustment mechanism is fixed to the reel mount, it has been hardly possible to effectively cope with all the plurality of positional relations of the tension control mechanism.

To solve this problem, in the case of the embodiment described above, two adjustment levers 21 and 22 are arranged on the chassis 1 to be capable of abutting on the belt stop 20 when the supply reel base 13 is in each of its positions set for the large cassette 8 and the small cassette 14. Therefore, the tension of the tape can be always adequately adjusted.

In the embodiment described above, the tension arm 16 and the brake arm 17 are arranged, by way of example, to be in contact with each other at parts symmetrically allocated with respect to the center of rotation. The same effect, however, can be attained by biasing this allocation to either side. Further, the supply reel base 13 is arranged to selectively take one of two positions for the large and small cassettes 8 and 14. The supply reel base 13, however, may be arranged to be capable of taking one of three or more different positions.

Further, the tape tension control device according to this invention is applicable not only to a reel-mount-shifting type magnetic recording and/or reproducing apparatus but also to a reel-mount-fixed type magnetic recording and/or reproducing apparatus.

As described above, in the tape tension control device arranged as the embodiment, the tension arm is set on the chassis and the brake arm is set on the supply reel base, separately from each other. These arms are arranged to come into contact with each other at either of a plurality of positions of the supply reel base, so that a greater amount of latitude can be allowed to a relation between the position of the tension arm and that of the brake arm. Further, in accordance with this invention, a magnetic recording and/or reproducing apparatus can be provided with a mechanical tension regulator at a low cost.

What is claimed is:

1. An apparatus capable of selectively loading cassettes of different sizes each containing a tape therein, comprising:

a) a first base on which a reel mount and a brake mechanism operable to apply a braking force to said reel mount are disposed;

b) a second base arranged to support said first base to allow for linear movement of said first base into a plurality of positions corresponding to the different sizes of cassettes loadable on the apparatus;

c) a tension detecting mechanism disposed on said second base and arranged to detect the tension of a tape pulled out from a cassette loaded on said apparatus; and d) control means for selectively diversely interrelating said brake mechanism and said tension detecting mechanism such that said brake mechanism is operable to apply braking force to said reel mount when said first base takes each of the plurality of positions.

2. An apparatus according to claim 1, wherein said tension detecting mechanism includes a swingable lever and a post provided in one end part of said lever.

3. An apparatus according to claim 2, wherein said lever has a protruding part arranged to be associated with said control means.

4. An apparatus according to claim 3, wherein said protruding part is provided in another end part of said lever.

5. An apparatus according to claim 4, wherein said protruding part includes two projections which are symmetrically arranged with respect to a center of rotation of said lever.

6. An apparatus according to claim 5, wherein said control means includes a rotary member which is rotatably supported by said first base.

7. An apparatus according to claim 6, wherein said brake mechanism has a band-shaped member wrapped around said reel mount to apply a braking force thereto, said band-shaped member having one end thereof supported by said rotary member and another end thereof supported by said first base.

8. An apparatus according to claim 7, wherein a support point on said first base at which said another end of said band-shaped member is supported by said first base is arranged to be displaceable.

9. An apparatus according to claim 8, further comprising an adjustment mechanism arranged to abut, when said first base takes each of the plurality of positions, a support point at which said another end of said band-shaped member is supported, from among different support points, correspondingly with the position taken by said first base.

10. An apparatus according to claim 9, wherein said adjustment mechanism includes an adjustment lever disposed on said first base and arranged to support said another end of said band-shaped member, and adjustment members disposed correspondingly with the plurality of positions and arranged to engage said adjustment lever.

11. An apparatus capable of selectively loading cassettes of different sizes each containing a tape therein and recording and/or reproducing information on or from the tape, comprising:

a) a movably mounted first base on which a reel mount is disposed;

b) a second base arranged to support said first base in such a way as to allow said first base to move linearly between a plurality of positions corresponding to the different sizes of the cassettes loadable on the apparatus; and c) a tension control mechanism, including:
        a brake mechanism disposed on said first base and operable to apply a braking force to said reel mount,
        a tension detecting mechanism disposed on said second base and arranged to detect the tension of a tape pulled out from a cassette loaded on said apparatus, and control means for selectively diversely interrelating said brake mechanism and said tension detecting mechanism such that said brake mechanism is operable to apply braking force to said reel when said first base takes each of the plurality positions.

12. An apparatus according to claim 11, wherein said tension detecting mechanism includes a swingable lever and a post provided in one end part of said lever.

13. An apparatus according to claim 12, wherein said lever has a protruding part arranged to be associated with said control means.

14. An apparatus according to claim 13, wherein said protruding part is provided in another end part of said lever.

15. An apparatus according to claim 14, wherein said protruding part includes two projections which are symmetrically arranged with respect to a center of rotation of said lever.

16. An apparatus according to claim 15, wherein said control means includes a rotary member which is rotatably supported by said first base.

17. An apparatus according to claim 16, wherein said brake mechanism has a band-shaped member wrapped around said reel mount to apply a braking force thereto, said band-shaped member having one end thereof supported by said rotary member and another end thereof supported by said first base.

18. An apparatus according to claim 17, wherein a support point on said first base at which said another end of said band-shaped member is supported by said first base is arranged to be displaceable.

19. An apparatus according to claim 18, further comprising an adjustment mechanism arranged to abut, when said first base takes each of the plurality of positions, a support point at which said another end of said band-shaped member is supported, from among different support points, correspondingly with the position taken by said first base.

20. An apparatus according to claim 19, wherein said adjustment mechanism includes an adjustment lever disposed on said first base and arranged to support said another end of said band-shaped member, and adjustment members disposed correspondingly with the plurality of positions and arranged to engage said adjustment lever.

21. An apparatus capable of selectively loading cassettes of different sizes each containing a tape therein, comprising:

a) a reel mount supported on a first base for translation in said apparatus into a plurality of positions corresponding to the different sizes of said cassettes loadable on said apparatus;

b) a brake mechanism operable to apply a braking force to said reel mount and supported on said first base for translation in said apparatus jointly with said reel mount;

c) a tension detecting mechanism supported on a second base non-translatably disposed in said apparatus and detecting tension of a tape pulled out from a cassette loaded on said apparatus, said first base supported for linear movement on said second base; and d) control means for effecting different mutual arrangement of said brake mechanism and said tension detecting mechanism in each of said plurality of positions.

22. An apparatus according to claimed in claim 21, further including tension adjusting means for adjusting the tension of a tape pulled out from a cassette loaded on said apparatus.

23. An apparatus according to claim 22, wherein said tension adjusting means comprises tension adjustment members in number corresponding with the number of positions in said plurality of positions.

* * * * *

UNITED STATES PATENT AND TRADEMARK OFFICE
CERTIFICATE OF CORRECTION

PATENT NO. : 5,609,310
DATED : March 11, 1997
INVENTOR(S) : Junji Kobayashi

It is certified that error appears in the above-identified patent and that said Letters Patent is hereby corrected as shown below:

Col. 2, line 65, delete "chassis 2" and insert -- chassis --.

Col. 4, line 28, delete "follows:" and insert -- follows. --.

Signed and Sealed this

Tenth Day of March, 1998

Attest:

BRUCE LEHMAN

Attesting Officer

Commissioner of Patents and Trademarks